(No Model.)

J. P. SIMMONS.
HYDRAULIC MINING GIANT.

No. 586,938. Patented July 20, 1897.

Witnesses:
M. S. Norton
J. P. Whalley

Inventor.
John P. Simmons.
By his Atty.
W. F. Smyth

THE NORRIS PETERS CO., PHOTO-LITHO., WASHINGTON, D. C.

UNITED STATES PATENT OFFICE.

JOHN PEARE SIMMONS, OF SAN FRANCISCO, CALIFORNIA.

HYDRAULIC MINING-GIANT.

SPECIFICATION forming part of Letters Patent No. 586,938, dated July 20, 1897.

Application filed March 18, 1896. Serial No. 583,806. (No model.)

*To all whom it may concern:*

Be it known that I, JOHN PEARE SIMMONS, a citizen of the United States, residing in the city and county of San Francisco and State of California, have invented an Improvement in Pipe-Joints for Hydraulic Giants, of which the following is a specification.

My invention relates to hydraulic giants, and particularly to means for facilitating their operation, whereby sliding friction incident to the upward and backward thrust of the hydraulic stream is eliminated from the joint. Described generally, it comprises a stationary pipe, a curved movable section, and a ball-bearing device connecting them, so constructed that the antifriction-balls oppose the thrust of the water. It also consists in the novel combination, arrangement, and construction of the several parts which I shall hereinafter fully describe and specifically claim.

The object of my invention is to provide a device for this purpose which shall be simple in construction and effective in operation, suitably arranged that sliding friction, when turning from side to side, incident to the upward force and backward reaction thrust of the powerful head of water employed in such devices is eliminated.

Figure 1:
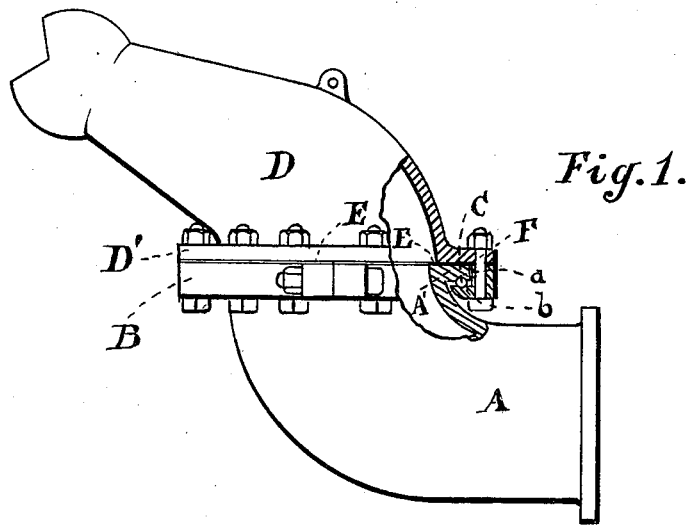
Figure 2:
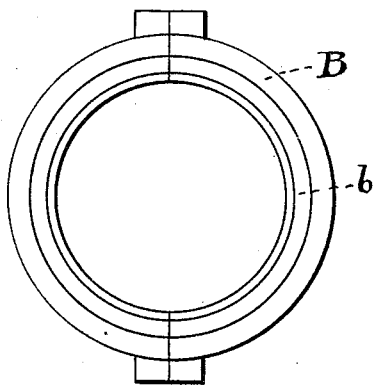
Figure 3:
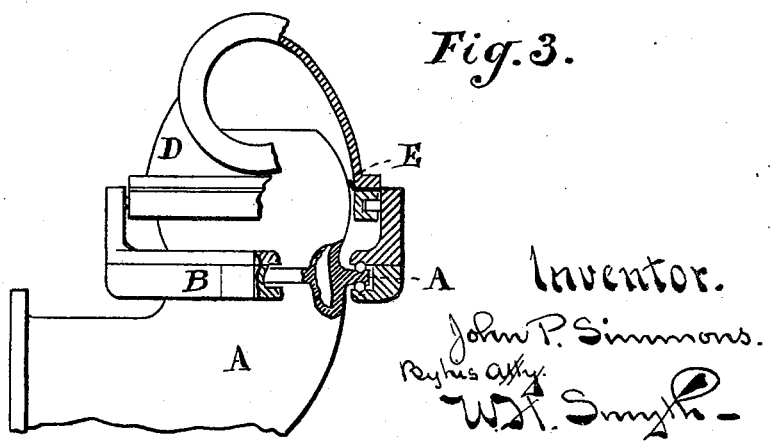

Referring to the accompanying drawings, Figure 1 is a side view of the principal portion of a double-jointed giant, portions being broken away to show the application of my invention. Fig. 2 is a plan view of the segmental ball-bearing ring. Fig. 3 is a side view of a single-jointed giant, portions being broken away to show the application of my invention.

A is the stationary pipe of a hydraulic mining-giant, provided with a flange A', which is truly turned not alone on the face, but also on the under side of the flange. It is provided with an annular groove $a$.

Embracing the end of the pipe and flange A' is a ring B, of L section, the inwardly-projecting flange of which is also provided with an annular groove $b$ of the same diameter as the groove $a$ in flange A'. Between grooves $a$ and $b$ are placed a number of bearing-balls C. D is a curved movable pipe or nozzle of a giant provided with a flange D'. Between the face of the flange B' is provided a packing-ring E, of leather or other suitable material. This packing-ring E is securely clamped between the ring B and the flange D' by bolts F F, which pass through ring B and flange D', the grooves $a$ and $b$ being brought thereby lightly in contact with the bearing-balls which are between them. This description refers particularly to Fig. 1.

In the case of the single-jointed giant shown in Fig. 3, wherein motion in all directions of the nozzle is provided for by a single universal joint, I have shown bearing-balls above as well as below the flange A. This form has some advantages, though it entails a somewhat greater expense. The ring B in this construction and also in that shown in Fig. 1 is made in sections.

Suitable packing E is employed to make a water-tight joint, which, by means of the fluid internal pressure, prevents leakage through the joints.

In operation the upward pressure and reactionary thrust upon the joint incident to the curved and contracted form of the movable section or nozzle is very great, the head being sometimes many hundred feet, necessitating the application of much force to overcome the friction and resistance of the joint in order to rotate the movable section.

By means of the construction herein described the friction caused by the upward force of the water partly, but also by the backward thrust or reaction of the powerful stream, is reduced to a minimum, and consequently the power required to move the joint.

The water-pressure upon the exposed portion of the packing-ring insures a water-tight joint.

Having now described my invention, what I claim as new, and desire to secure by Letters Patent, is—

1. A hydraulic giant comprising a stationary pipe, a curved movable section and a ball-bearing-joint connection between them.

2. A hydraulic giant comprising a stationary pipe, a curved movable section and a water-tight ball-bearing-joint connection between them.

3. A hydraulic giant comprising a stationary pipe, a curved movable section and a ball-bearing connection provided with a ring or washer adapted to receive the thrust of the movable section.

4. A hydraulic giant comprising a stationary pipe, a curved movable section and a water-tight ball-bearing connection having a bearing-ring made in sections.

5. In a hydraulic giant the combination of a stationary pipe a movable section and a water-tight joint between said pipe and movable section consisting of flanges A' and B', suitable packing-rings as described secured in place by the grooved and jointed ring B, and ball-bearings C arranged substantially as described.

6. A hydraulic giant comprising a stationary pipe with a curved movable section, and a device connecting them having a holding-ring provided with antifriction-balls upon opposite sides for the purpose herein described.

JOHN PEARE SIMMONS.

Witnesses:
M. S. NORTON,
I. R. WHALLEY.